2,886,592
Patented May 12, 1959

2,886,592

PROCESS FOR MAKING IODO DERIVATIVES OF THYRONINE

Gunther Hillmann, Tuebingen, Germany

No Drawing. Application March 4, 1957
Serial No. 643,547

Claims priority, application Germany March 7, 1956

2 Claims. (Cl. 260—519)

This invention relates to a process for preparing iodo derivatives of thyronine.

It is known that a number of iodo derivatives of thyronine possess a similar or related biological activity to that of the natural hormone of the thyroid gland. It is known, further, that a substance isolated from the thyroid gland was identified as 3,5,3',5'-tetraiodothyronine and that this compound, now known as thyroxine, has been chemically synthesized. Thyroxine, which has the following chemical structure,

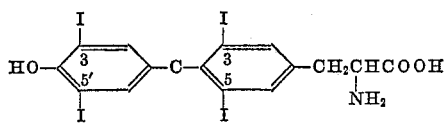

has proved to be a difficult compound to synthesize; the main problem in the synthesis has been the lack of a simple and straight-forward scheme for the formation of the diphenyl ether part of the structure. Thus far, two essentially different syntheses of thyroxine have been published. The first, which is the so-called classic synthesis of Harrington and Barger, Biochemical Journal 21, 169, (1927), has been modified several times and yields as end-product a racemic mixture of thyroxine. More recently, a further synthesis of thyroxine as the levo-rotatatory form thereof, was published by J. R. Chalmers, G. T. Dickson, J. Elks and B. A. Hems, Journal of the Chemical Society 3424 (1949). The latter synthesis starts with L-tyrosine which is converted to the pyridinium salt of the p-toluenesulfonyl ester of 3,5-dinitro-N-acetyl-L-tyrosine ethyl ester which in turn is used as phenylating agent in the reaction with p-methoxyphenol to furnish the diphenyl ether structure corresponding to thyronine.

It is an object of this invention to provide a new and simplified route to the synthesis of thyroxine and other iodo derivatifes of thyronine. The process of this invention, as applied to the synthesis of thyroxine and 3,5,3'-triiodothyronine, may be represented by the following scheme:

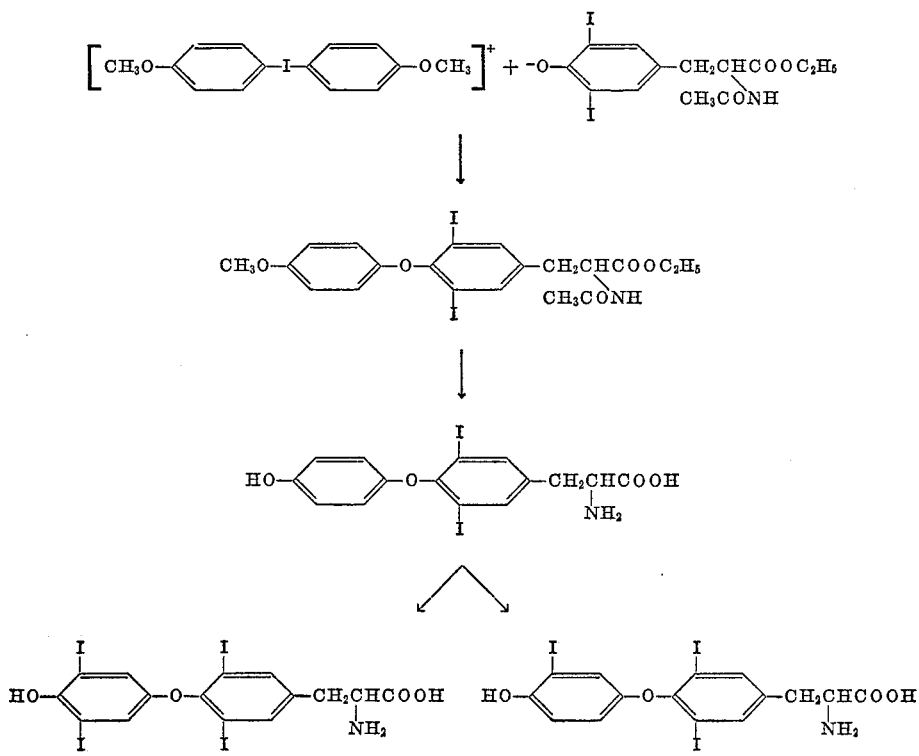

Thus phenylation of N-acetyl-3,5-diiodotyrosine ethyl ester by means of 4,4'-dimethoxydiphenyliodonium bromide in the presence of a basic condensing agent such as magnesium methylate or sodium methylate, in an anhydrous solvent under reflux, gives rise to N-acetyl-3,5-diiodo-4-(4'-methoxyphenoxy)phenylalanine ethyl ester which after boiling with hydrobromic acid or hydriodic acid in glacial acetic acid yields 3,5-diiodothyronine which is an intermediate in all known syntheses of thyroxine. It will be observed that the new process of this invention provides a means of obtaining the important intermediate 3,5-diiodothyronine by avoiding two tedious synthetic steps following the diphenyl ether formation by prior art procedures, namely reduction and tetrazotization.

In accordance with this invention, iodination of the 3' and 5' positions of thyronine can be conveniently performed by means of N-iodoacetamide. Thus, iodination of 3,5-diiodothyronine with a stoichiometric amount of N-iodoacetamide in a mixture of anhydrous methanol and triethylamine readily furishes thyroxine.

It is commonly accepted that no satisfactory procedure is known in the prior art, for the convenient preparation and isolation of 3,5,3(-triiodothyronine which has been shown to be approximately five times as biologically active as thyroxine. All prior art procedures for iodination of 3,5-diiodothyronine to 3,5,3'-triiodothyronine invariably give rise to a mixture of thyroxine, 3,5,3'-triiodothyronine and unreacted 3,5-diiodothyronine [J. Gross and R. Pitt-Rivers, Biochemical Journal 53, 654 (1953); J. Roche, A. Lissitsky, and R. Michel, comptes rendus 234, 997 (1952)]. Whereas separation of triiodothyronine and diiodothyronine is relatively facile on the basis of solubility differences in hydrochloric acid, the separation of triiodothyronine from thyroxine invariably requires the use of tedious chromatographic techniques.

In accordance with this invention the treatment of 3,5-diiodothyronine in dilute solution with not more than one half equivalent of iodine or other iodinating agents such as iodine-potassium iodide solution or N-iodoacetamide in basic solution gives rise to 3,5,3'-triiodothyronine contaminated by unreacted 3,5-diiodothyronine but uncontaminated by thyroxine. Recrystallization of the mixture from dilute aqueous hydrochloric acid gives rise to 3,5,3'-triiodothyronine which is homogeneous by paper chromatography tests. This result was unexpected inasmuch as it clearly appeared, from prior art disclosures, that in the preparation of 3,5,3'-triiodothyronine, slight amounts of thyroxine were invariably produced. Further, it is known from several examples published in the technical literature, that iodination of phenols in basic medium does not lead to monoiodo products free from products having a higher degree of iodination.

It is a noteworthy feature of this invention that none of the new steps described has been observed to cause racemization of an optically active substance. Thus, if the N-acetyl-3,5-diiodotyrosine ester used as starting material is optically active, no appreciable racemization will occur throughout the process. Thus the process of this invention is especially valuable for the synthesis of L-3,5-diiodothyronine, L - 3,5,3' - triiodothyronine and L-thyroxine.

The invention is illustrated by the following examples:

EXAMPLE 1

L-3,5-diiodothyronine

A mixture of 0.2 mol of 4,4'- dimethoxydiphenyliodonium bromide [prepared by the procedure of Beringer et al, J.A.C.S. 75, 2708 (1953); R. A. Mastropaoles, Anales Asoc Quim Argentina 28, 101 (1940)], 0.1 mol of the ethyl ester of L-N-acetyl-3,5-dioodotyrosine and a solution of 0.1 mol of magnesium in 800 ml. of absolute methanol was heated under reflux for approximately 80 hours, whereafter the solvent was removed by distillation and the residue was thoroughly mixed with a mixture of benzene and aqueous hydrobromic acid. The unreacted iodonium salt was removed by filtration and the filtrate was extracted with 1 N aqueous sodium hydroxide followed by passage through an alumina column in order to remove unreacted acetyldiiodotyrosine ester. The benzene solution was then evaporated under vacuum and the residue was treated with petroleum ether and induced to crystallize at 0° C. The mother liquor was decanted and the residue was recrystallized from 50% aqueous ethanol. The resulting ethyl ester of L-N-acetyl-3,5 - diiodo - 4 - (4' - methoxyphenoxy)phenylalanine melting point 143° C., was heated under reflux with a mixture of hydrobromic acid and glacial acetic acid, and the resulting diiodothyronine hydrobromide was treated with aqueous sodium acetate whereupon L-3,5-diiodothyronine was obtained. The yield of the condensation was approximately 50%, and the yield of the hydrolysis with hydrobromic acid was approximately 80%.

EXAMPLE 2

L-3,5,3'-triiodothyronine

A solution of 0.001 mol of L-3,5-diiodothyronine in 80 ml. of ammoniacal methanol solution was treated at room temperature and with rapid stirring with one half of an equivalent of 0.5 N solution of iodine and potassium iodide, during the course of 1 hour. The solution was allowed to stand for 2 hours whereafter it was concentrated to one quarter volume, made up to 100 ml. with water, heated to 60° C. and adjusted with glacial acetic acid to a pH between 4 and 5. The mixture was allowed to stand at 0° C. for several hours and the resulting precipitate was collected on a filter, and dissolved in boiling 2 N hydrochloric acid. The resulting solution was filtered, kept at 0° C. for several hours and the resulting precipitate was collected and recrystallized 3 more times from 2 N hydrochloric acid. The resulting triiodothyronine hydrochloride was then dissolved in 0.1 N aqueous sodium hydroxide, whereafter the pH of the solution was adjusted to 4–5 with glacial acetic acid and the resulting precipitate was collected, washed and dried. This material, which was the desired L-3,5,3'-triiodothyronine, melting point 231–234° C., was obtained in a yield of approximately 50% of theoretical. The substance was shown to be pure by paper chromatography tests using the solvent system butanol/2 N ammonia as well as the solvent system isoamyl alcohol/5 N ammonia. The unreacted diiodothyronine was recovered from the mother liquors by concentration, and precipitation with sodium acetate and alcohol.

EXAMPLE 3

L-thyroxine

A solution of 0.001 mol of L-3,5-diiodothyronine in a mixture of 30 ml. of absolute methanol and 30 ml. of anhydrous triethyl amine was treated gradually, at room temperature and with constant stirring, with a solution of 400 mg. of N-iodoacetamide in 10 ml. of methanol. The resulting solution was allowed to stand for 12 hours, whereafter it was filtered, evaporated under vacuum and digested with 50 ml. of 2 N hydrochloric acid at approximately 50° C. The resulting solution was treated with sodium bisulfite, heated to 50° C., adjusted to pH 4 with glacial acetic acid and allowed to stand at 0° C. for several hours. The resulting precipitate was filtered, washed and dried. Further purification was carried out by recrystallization from 0.1 N aqueous sodium hydroxide. The yield of L-thyroxine thus obtained was approximately 95% of theoretical.

Since certain changes may be made in the process above described without departing from the scope of this invention, it is intended that all matter contained in the above description shall be interpreted as illustrative, and not in a limiting sense.

What is claimed is:

1. In a process for the production of 3,5-diiodothyronine, the steps which comprise refluxing a 4,4'-dialkoxy-diphenyliodonium salt with a lower alkyl ester of 3,5-diiodo-N-acetyltyrosine in anhydrous methanol containing a member of the group consisting of magnesium methylate and sodium methylate, separating the 3,5 - diiodo - N-acetyl - 4 - (4'-alkoxyphenoxy)phenylalanine lower alkyl ester formed, and then hydrolyzing the latter whereby 3,5-diiodothyronine is obtained.

2. In a process for the production of 3,5-diiodo-thyronine, the steps which comprise refluxing a 4,4-methoxy-diphenyliodonium salt with the ethyl ester of 3,5-diiodo-N-acetyltyrosine in anhydrous methanol containing a member of the group consisting of magnesium methylate and sodium methylate, separating the 3,5-diiodo-N-acetyl-4-(4-methoxyphenoxy)phenylalanine ethyl ester formed, and hydrolyzing the latter whereby 3,5-diiodothyronine is obtained.

References Cited in the file of this patent

UNITED STATES PATENTS

| | | |
|---|---|---|
| 2,579,668 | Hems et al. | Dec. 25, 1951 |
| 2,591,776 | Borrows | Apr. 8, 1952 |
| 2,600,835 | Borrows et al. | June 17, 1952 |
| 2,680,762 | Dickson | June 8, 1954 |

OTHER REFERENCES

Beringer et al.: J. Am. Chem. Soc. 75, 2708 to 2712 (1953).